United States Patent [19]
Roestenberg

[11] Patent Number: 5,125,813
[45] Date of Patent: Jun. 30, 1992

[54] MOLDING PLATE

[76] Inventor: Jerome R. Roestenberg, 11 Woodpecker La., Levittown, N.Y. 11756

[21] Appl. No.: 729,488

[22] Filed: Jul. 12, 1991

[51] Int. Cl.⁵ .......................... B28B 7/06; B28B 7/36; B28B 11/10
[52] U.S. Cl. ..................................... 425/12; 249/113; 264/313; 264/316; 425/318; 425/458
[58] Field of Search ................ 425/12, 11, 84, 89, 425/328, 318, 324.1, 385, 396, 458, 403; 264/86, 313, 316; 249/112, 113

[56] References Cited

U.S. PATENT DOCUMENTS

| | | | |
|---|---|---|---|
| 4,454,081 | 6/1984 | Soulier | 249/113 |
| 4,695,032 | 9/1987 | Desport | 249/112 |
| 4,787,597 | 11/1988 | Yokota et al. | 249/113 |
| 4,800,054 | 1/1989 | Roestenberg | 264/86 |
| 4,856,754 | 8/1989 | Yokota et al. | 264/86 |

*Primary Examiner*—Jay H. Woo
*Assistant Examiner*—K. P. Nguyen
*Attorney, Agent, or Firm*—Nolte, Nolte and Hunter

[57] ABSTRACT

A composite material for use as a molding plate in a method of shaping molding compounds in the repair and restoration of damaged surfaces. In the preferred embodiment, a layer of expanded metal is bonded to a plurality of perforated plastic strips.

5 Claims, 4 Drawing Sheets

MOLDING PLATE

BACKGROUND OF THE INVENTION

The present invention relates to a composite material for use as a molding plate in a method of shaping molding compound in the repair and restoration of damaged surfaces.

In U.S. Pat. No. 4,800,054, I disclosed a method for modifying a surface to a desired contour by pressing a flexible molding plate, having holes for releasing trapped fluids and excess molding compound, against the molding compound using a device having a plurality of pressure points conforming to the desired contour or, in the alternative, by going over the molding plate with a hand-held roller, rod, or pressure pad and relying on the adhesive force of the molding compound to hold the plate in place.

I have since devised an improved molding plate comprising a two-ply composite of an expanded malleable layer bonded with a perforated flexible layer

SUMMARY OF THE INVENTION

It is an object of the invention to lower the cost of molding a desired contour on a surface by providing a molding plate material that is easily and cheaply manufactured.

It is a further object of this invention to permit the application of the material to the surface to be molded without the use of complicated apparatuses.

It is a further object of this invention to provide a means of contouring a surface with minimum operator skill.

It is a further object of this invention to provide a contoured molded surface that requires minimal post-finishing.

Other objects and advantages will become apparent from the description that follows.

DETAILED DESCRIPTION OF THE DRAWINGS

Figure 1:
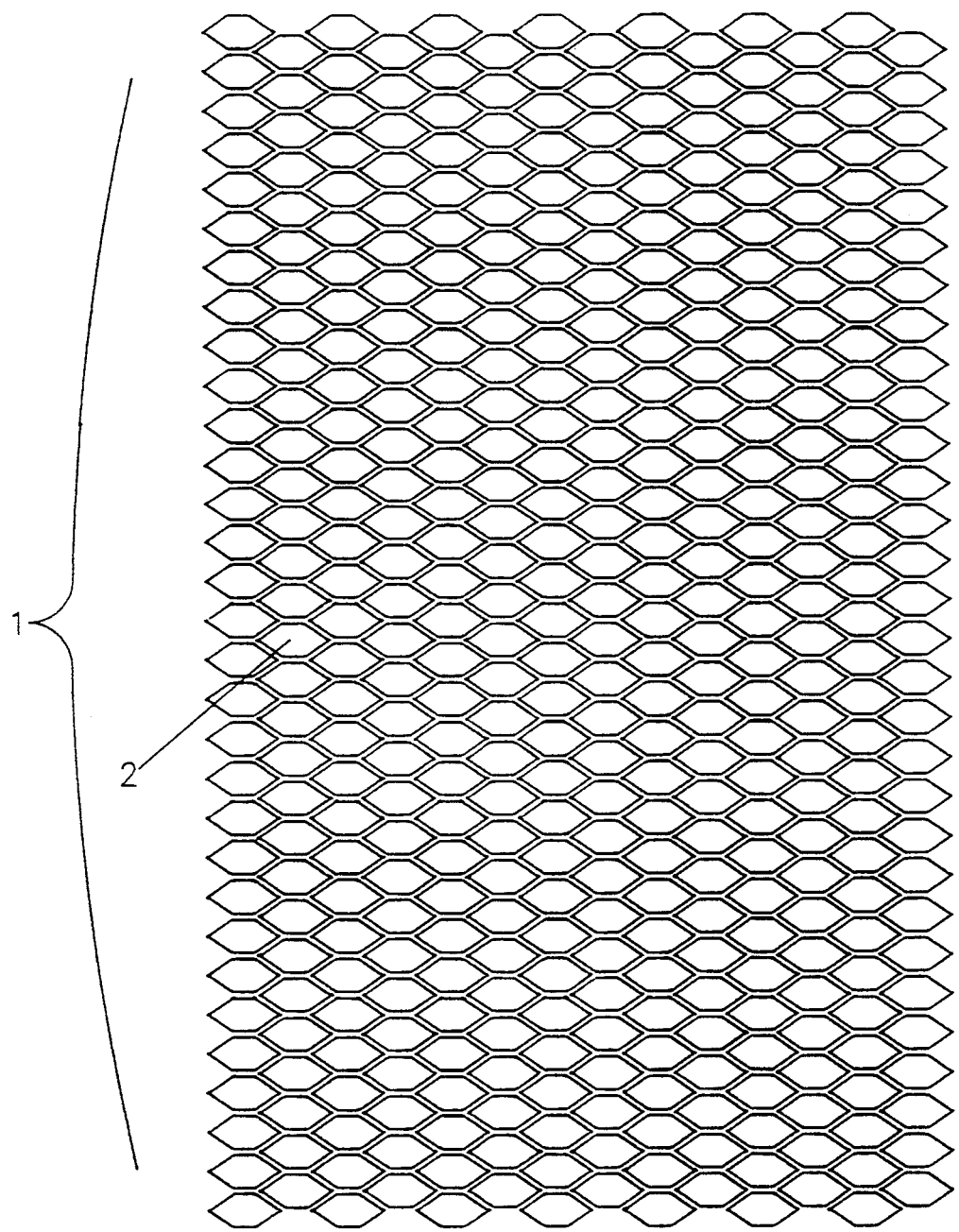
FIG. 1 is a top plan view of the pattern of an expanded malleable material.

FIG. 1 shows a sheet 1 of an expanded material. For the Purposes of this invention, the material should be malleable. That is, that it should be easily bent, yet retain the configuration of whatever shape it is bent to.

Expanded materials are commercially available and are typically made of any type metal such as copper or aluminum or plastic or paper. They are produced by taking a thin sheet of metal typically ranging from one to ten one thousandths of an inch thick (though even thicker sheets are available) and stamping a pattern of slits such that, when pulled apart, a pattern emerges as shown in the FIGURE. The most common pattern is a plane of adjacent hexagonal openings 2. The advantage of the expanded material for the purposes of this invention is that it can be compressed or expanded along any axis lying in the plane defined by the sheet of material.

Figure 2:
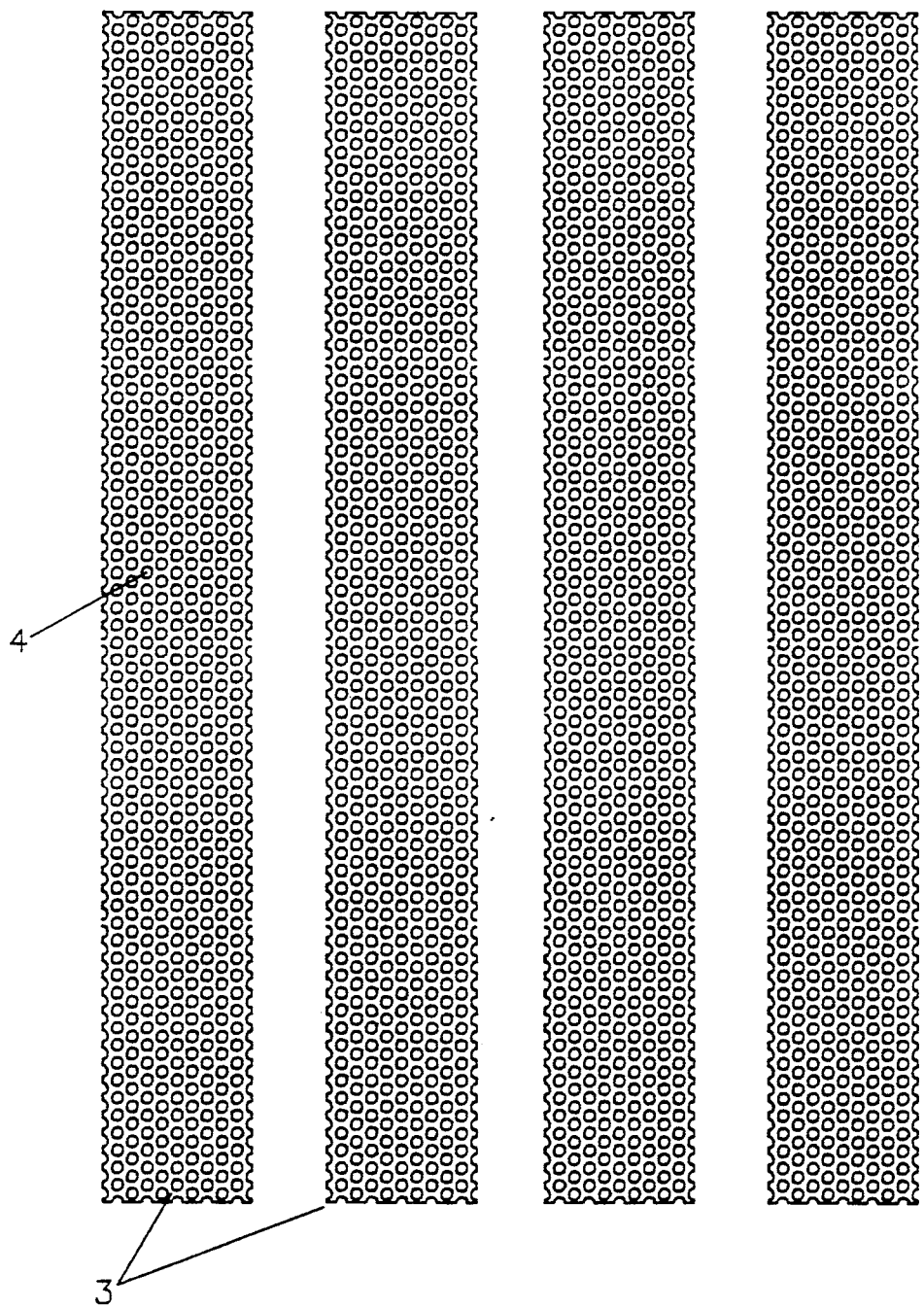
FIG. 2 is a top plan view of the pattern of strips of perforated flexible material.

FIG. 2 shows a set of flexible strips having 3 multiple perforations. These strips are preferably made of a material that can be readily peeled away from a hardened molding compound in which they are in contact. Plastic is the preferred material, but paper or plasticized paper will also work on some applications.

Figure 3:
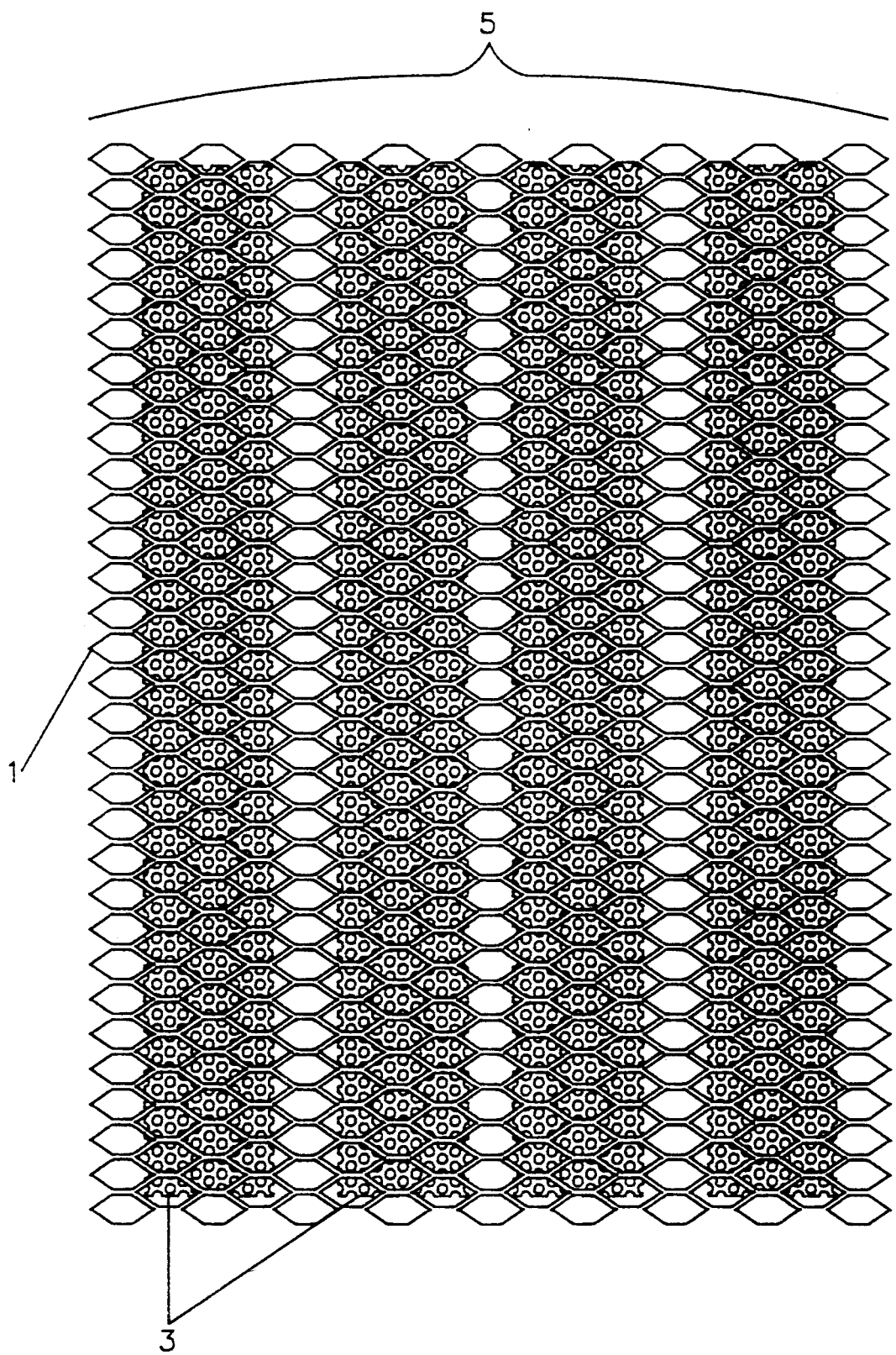
FIG. 3 is a top plan view of the pattern of the invention when the two layers are bonded.

FIG. 3 depicts the plastic or paper strips 3 bonded beneath the expanded metal 1 to form the composite molding plate 5. Bonding may be achieved with an adhesive or by heating the expanded metal to partially melt the plastic on to it.

It is now apparent why individual plastic strips are used rather than a single solid layer for highly contoured surfaces the—expanded metal in the spaces between each strip are readily capable of conforming to surfaces of complicated curvature because of the expanded material's ability to compress or expand without kinking away from the desired curvature. The plastic strips serve to create relatively smooth surfaces and facilitate the peeling away of the mold plate after the compound has hardened.

For relatively large surfaces with little curvature a single solid layer of perforated plastic may be used. In addition, for excessively large surfaces such as the side of a railroad box car, the expanded layer can be of sufficiently heavy gauge that there is little flexibility in the molding plate formed.

Figure 4:
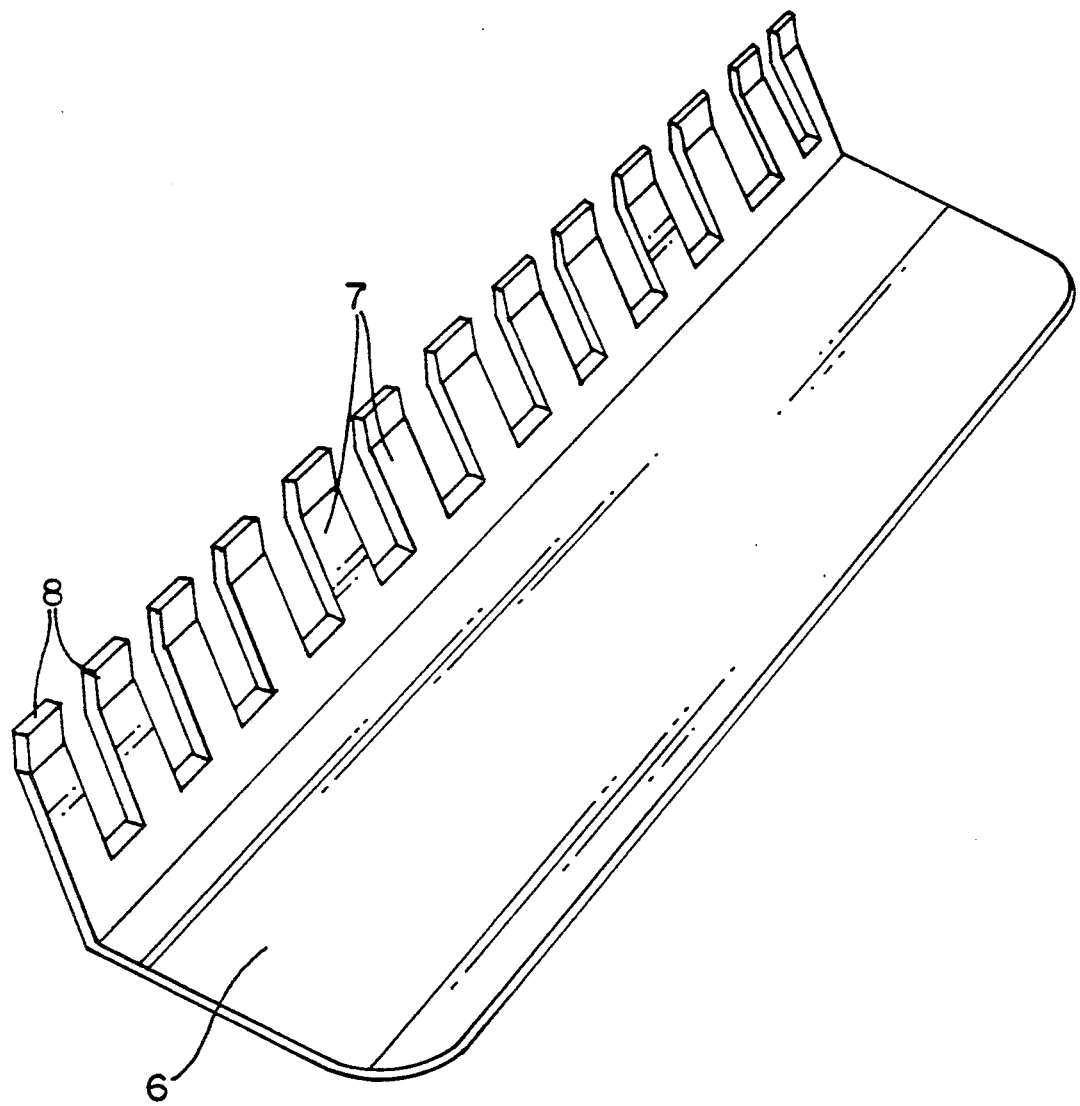
FIG. 4 is a perspective view of an applicator.

FIG. 4 depicts a molding comb that is preferably made of a resilient plastic and which has a flat base 6 which acts as a handle at an angle to a plurality of flat tines 7, each of which has an end 8 blunted by further angling. In the preferred embodiment, the tines 7 are angled 45 degrees to the base 6 and the ends 8 are perpendicular to the base (i.e. 45 degrees to tines).

The method of repairing a surface such as a dent in an automobile, would be to place excess molding compound into the defect and place a sheet of mold plate on the compound with the perforated plastic layer in direct contact thereto. The operator then presses and contours the mold plate with the aid of the comb.

As the operator does so, excess compound extrudes through the openings in the mold plate. This allows ease and precision of contouring by preventing the formation of air traps beneath the plate and by not requiring the excess to be forced out from beneath the outside edges of the plate.

After hardening, the plate is readily peeled from the compound and the burrs formed by extrusion through the openings are easily sanded.

Changes and modifications can be made by those skilled in the art to the embodiments as disclosed herein and such examples and illustrations are for explanatory purposes and are not intended to limit the scope of the claims.

I claim:

1. A composite molding plate for shaping molding compound comprising:
    a first layer comprising a malleable material defining a first set of multiple perforations;
    said first layer being compressible and expandable along any axis lying in a plane defined by said layer to constitute said first layer as means for extending and contracting the perimeter thereof with said perforations in close proximity to one another, separated by a portion of said malleable material;
    said portions of malleable material substantially smaller than the width of apertures defined by said perforations when said layer is expanded to its maximum extent along both of any two orthogonal axes lying in said plane;

a second layer comprising a flexible material defining a second set of multiple perforations and which is not compressible and expandable along axes within the plane of said second layer;

said first layer bonded to said second layer; and said first and second sets of perforations of a size to constitute means for extruding therethrough of the molding compound when pressed against said molding compound.

2. The invention of claim 1 wherein said first layer comprises an expanded material from the group consisting of metal, plastic, and plasticized paper.

3. The invention of claim 1 wherein said second layer comprises a flexible material from the group consisting of plastic, paper, and plasticized paper.

4. The invention of claim 1 wherein said second layer further comprises a plurality of strips of said flexible material.

5. A composite molding plate for contouring a surface with molding compound comprising:

first and second layers of flexible material bonded one to the other;

both of said layers defining multiple perforations through which excess molding compound is extruded when said molding plate is pressed against the molding compound, when pressing said plate to a desired contour said first layer of material being compressible and expandable along any axis lying in a plane defined by said first layer and comprising means for extending and contracting the perimeter thereof;

said first layer being malleable and comprising means for conforming its shape to the surface being contoured when pressed and for retaining that shape.

* * * * *